US009551323B2

(12) United States Patent
Garcia et al.

(10) Patent No.: US 9,551,323 B2
(45) Date of Patent: Jan. 24, 2017

(54) POWER PLANT CONTROL DURING A LOW VOLTAGE OR A HIGH VOLTAGE EVENT

(71) Applicant: VESTAS WIND SYSTEMS A/S, Aarhus N (DK)

(72) Inventors: Jorge Martinez Garcia, Aarhus N (DK); Mu Wei, Risskov (DK); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 15 days.

(21) Appl. No.: 14/428,019

(22) PCT Filed: Aug. 22, 2013

(86) PCT No.: PCT/DK2013/050271
§ 371 (c)(1),
(2) Date: Mar. 13, 2015

(87) PCT Pub. No.: WO2014/040600
PCT Pub. Date: Mar. 20, 2014

(65) Prior Publication Data
US 2015/0211492 A1    Jul. 30, 2015

(30) Foreign Application Priority Data
Sep. 14, 2012  (DK) ................. 2012 70568

(51) Int. Cl.
*F03D 9/00*  (2016.01)
*H02P 9/04*  (2006.01)
(Continued)

(52) U.S. Cl.
CPC ............. *F03D 9/003* (2013.01); *F03D 7/042* (2013.01); *F03D 7/043* (2013.01); *F03D 7/048* (2013.01);
(Continued)

(58) Field of Classification Search
USPC ...................................... 290/44, 55
See application file for complete search history.

(56) References Cited

U.S. PATENT DOCUMENTS 5,014,770 A * 5/1991 Palmer ............... F24D 3/005
126/563
5,041,959 A * 8/1991 Walker ............... H02J 15/00
307/46
(Continued)

FOREIGN PATENT DOCUMENTS

DE  102009027981 A1  1/2011
EP      2072813 A2   6/2009
(Continued)

OTHER PUBLICATIONS

International Search Report for PCT/DK2013/050271, Jun. 11, 2014.
Danish Search Report for PA 2012 70568, Mar. 20, 2013.

*Primary Examiner* — Pedro J Cuevas
(74) *Attorney, Agent, or Firm* — Patterson + Sheridan, LLP

(57) ABSTRACT

The present invention relates to a method for controlling a wind power plant, comprising one or more wind turbine generator(s) connected to an electrical grid, and a power plant controller having an operational mode, controlling electrical parameters, wherein the method comprises, determining a first voltage level of one or more wind turbine generator(s), determining if the first voltage level of one or more wind turbine generator(s) is outside a first predetermined range, in case the first voltage level of one or more wind turbine generator(s) is outside a first predetermined range then, changing the operational mode of the power plant controller between first and second operational modes, the first operational mode controlling a first electrical parameter, the second operational mode controlling a second
(Continued)

electrical parameter, the first and second parameters being different. The present invention also relates to a power plant controller and a wind power plant operated according to the method.

15 Claims, 3 Drawing Sheets

(51) Int. Cl.
 *H02J 3/38* (2006.01)
 *F03D 7/04* (2006.01)
(52) U.S. Cl.
 CPC .......... *H02J 3/386* (2013.01); *F05B 2270/337* (2013.01); *Y02E 10/723* (2013.01); *Y02E 10/763* (2013.01)

(56) References Cited

U.S. PATENT DOCUMENTS

| | | | | |
|---|---|---|---|---|
| 6,452,289 B1* | 9/2002 | Lansberry | ................. | H02J 3/32 307/25 |
| 7,203,078 B2* | 4/2007 | Datta | ................... | H02M 7/219 363/37 |
| 7,569,944 B2* | 8/2009 | Oohara | ................. | F03D 7/0224 290/44 |
| 7,679,208 B1* | 3/2010 | Ko | ........................ | F03D 7/0224 290/44 |
| 7,816,798 B2* | 10/2010 | Hehenberger | ........ | F03D 7/0224 290/43 |
| 8,030,791 B2* | 10/2011 | Lang | .................. | H02M 5/4505 290/43 |
| 8,350,397 B2* | 1/2013 | Lang | .................. | H02M 5/4505 290/44 |
| 8,577,508 B2* | 11/2013 | Li | .......................... | F03D 9/003 290/2 |
| 8,587,160 B2* | 11/2013 | Dai | ........................ | H02J 3/386 307/151 |
| 8,680,720 B2* | 3/2014 | Schauder | ................ | H02M 1/42 307/140 |
| 9,046,077 B2* | 6/2015 | Kirchner | ............... | F03D 7/0284 |
| 9,118,214 B2* | 8/2015 | Nielsen | ................... | F03D 9/005 |
| 9,348,324 B2* | 5/2016 | Garcia | ................. | H02J 3/1878 |
| 9,366,227 B2* | 6/2016 | Garcia | ...................... | H02J 3/18 |
| 2005/0286279 A1* | 12/2005 | Datta | .................... | H02M 7/219 363/89 |
| 2010/0025995 A1* | 2/2010 | Lang | .................. | H02M 5/4505 290/44 |
| 2011/0057444 A1* | 3/2011 | Dai | ........................ | H02J 3/386 290/44 |
| 2011/0316490 A1* | 12/2011 | Lang | .................. | H02M 5/4505 322/21 |
| 2012/0105023 A1* | 5/2012 | Schauder | ................ | H02M 1/42 323/207 |
| 2013/0184884 A1* | 7/2013 | More | .................... | F03D 7/0284 700/291 |
| 2014/0086723 A1* | 3/2014 | Bengtson | ................ | F03D 7/047 415/1 |
| 2014/0375053 A1* | 12/2014 | Nielsen | ................... | F03D 9/005 290/44 |
| 2015/0137520 A1* | 5/2015 | Garcia | ................. | H02J 3/1885 290/44 |
| 2015/0145336 A1* | 5/2015 | Paquin | ................... | H02M 1/10 307/52 |
| 2016/0041568 A1* | 2/2016 | Daley | ....................... | G05F 1/14 323/341 |

FOREIGN PATENT DOCUMENTS

| | | |
|---|---|---|
| WO | 2010/085987 A2 | 8/2010 |
| WO | 2010/086415 A1 | 8/2010 |
| WO | 2012/028150 A2 | 3/2012 |

* cited by examiner

POWER PLANT CONTROL DURING A LOW VOLTAGE OR A HIGH VOLTAGE EVENT

FIELD OF THE INVENTION

The present invention relates to a method for controlling a wind power plant, comprising one or more wind turbine generator(s) connected to an electrical grid, and a power plant controller having an operational mode, wherein the power plant controller is arranged for controlling electrical parameters, the invention also relates to a power plant controller.

BACKGROUND OF THE INVENTION

Internal power grids of wind power plants connect individual wind turbine generators of a wind power plant to a point of common coupling—the latter being the point where power is fed onto a power supply grid from the wind power plant. In order to do this correctly the impedance of the internal power grid between each of the wind turbines of the plant and the point of common coupling has to be taken into consideration.

The wind turbine experiencing the highest impedance to the point of common coupling needs to generate the highest wind turbine voltage level in order to compensate for voltage drops in the internal power grid. However, by following this approach the highest wind turbine voltage level within the plant may become dangerously close to, or even exceed, an upper voltage level with the risk of damaging the internal grid.

Moreover, a long time exposure to a low voltage level, being lower than the nominal voltage level could result in damages to the equipment. This is due to higher currents in order to keep the power level constant.

The voltage profiles of wind turbines connected to the internal power grid depend on the impedance values and the apparent power flowing through the internal power grid.

It may be seen as an object of embodiments of the invention to provide a method that ensures that:
  no damage is caused to the equipment in an improved manner when compared to existing technology.
  a predetermined voltage level within the wind power plant is not exceeded.

It may be seen as a further object of embodiments of the present invention to provide an improved method which ensures that an overvoltage level and/or an undervoltage level within the wind turbine plant is not exceeded.

SUMMARY OF THE INVENTION

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Thus, the above described object and several other objects are intended to be obtained in a first aspect of the invention by providing a method for controlling a wind power plant, comprising one or more wind turbine generator(s) connected to an electrical grid, and a power plant controller having an operational mode, wherein the power plant controller is arranged for controlling electrical parameters, wherein the method comprises:
  determining a first voltage level of one or more wind turbine generator(s),
  determining if the first voltage level of one or more wind turbine generator(s) is outside a first predetermined range, in case the first voltage level of one or more wind turbine generator(s) is outside a first predetermined range then,
  changing the operational mode of the power plant controller between first and second operational modes, wherein the power plant controller in the first operational mode is controlling a first electrical parameter, and wherein the power plant controller in the second operational mode is controlling a second electrical parameter, the first and second parameters being different.

The invention is particularly, but not exclusively, advantageous for obtaining a wind power plant that offers a stable and robust power production, as the invention prevents disconnection of individual wind turbine generator, this is obtained by providing a change in control toward a control scheme that help the voltage level at terminal of the individual wind turbine generator to change towards a safe operational window.

According to one embodiment of the invention, wherein subsequent to the change of the operational mode of the power plant controller, the method further comprising the step of:
  dispatching a set point according to the second operational mode to the one or more wind turbine generator(s).

An advantage of this embodiment is that whenever the control mode has changed a new set point will be dispatched, and the individual wind turbine generators will change it production accordingly and thus change the voltage level at the terminals.

According to one embodiment of the invention, wherein subsequent to the change of the operational mode of the power plant controller, the method further comprises the step of:
  dispatching an interim set point as determined according to the first operational mode to the one or more wind turbine generator(s) and,
  ramping the interim set point to a set point as determined according to the second operational mode, with a ramp rate value, until the interim set point equals the set point according to the second operational mode.

An advantage of this embodiment is that the ramping of the interim set point allows for a smooth transition from the first to the second operational mode, i.e. bumpless transfer. Bumpless transfer ensures stability in the electrical grid of the wind power plant.

According to one embodiment of the invention, the first operational mode is controlling a power factor and the second operational mode is controlling a voltage level or a reactive power.

An advantage of this embodiment is that when a high voltage event occurs, there may be production mode where a natural increase in active power production also would require an increase in reactive power, which would lead to a further voltage increase, and thus push the wind turbine generator further in the direction of a higher voltage event. Instead the change of mode towards direct voltage level control or reactive power decouples the active power production from the reactive power production.

According to one embodiment of the invention, the first operational mode is controlling a voltage level and the second operational mode is controlling a power factor or a reactive power.

According to one embodiment of the invention, the first operational mode is controlling a reactive power and the second operational mode is controlling a voltage level or a power factor.

An advantage of these embodiments is that various production mode may require a change in operational mode in order to overcome the situation.

According to one embodiment of the invention, the voltage level is determined based on a positive sequence part of a determined voltage level.

An advantage of this embodiment is that the negative sequence part of the determined voltage level comprises parts of the signal that contains distortions and harmonics, taking the negative sequence into account may lead unstable control.

According to one embodiment of the invention, the step of determining whether the first voltage level is outside a first predetermined range is carried out in a wind turbine controller within the wind turbine generator, and the result is communicated to the power plant controller.

An advantage of this embodiment is that when the determination is carried out in the wind turbine, the amount of data that needs to be communicated to the power plant controller is very limited, as single bit flag is sufficient to signal that an event at the specific wind turbine generator has occurred.

According to one embodiment of the invention, wherein operating the wind power plant according to the second operational mode further comprises the steps of:
  determining a second voltage level of one or more wind turbine generator(s),
  determining if the second voltage level is inside a first predetermined range, if the second voltage level is inside a first predetermined range then,
  changing the operational mode of the power plant controller from the second operational mode to the first operational mode.

An advantage of this embodiment is that whenever the high or low voltage event is past, it is necessary to return to normal mode.

According to one embodiment of the invention, the changing of the operational mode is based on a hysteresis control algorithm and/or a timer.

An advantage of this embodiment is that using a hysteresis control or a timer prevents the power plant controller to toggle between the first and second mode several times.

According to one embodiment of the invention, the step of determining the first voltage level or the second voltage level is carried out by an estimate based on electrical parameters in the wind power plant.

An advantage of this embodiment is that no actual measurement has to be taken, and thus the method is not dependent on communication between the power plant controller and the individual wind turbine generator. This method can also establish the limits for the dispatcher of Q, basis on estimation of maximum/minimum possible voltage increase/decrease. These limits will ensure that no higher Q is sent to the WTGs to avoid disconnection.

According to one embodiment of the invention, the step of determining the first voltage level or the second voltage level is carried out by measurement of the first voltage level or the second voltage level respectively.

An advantage of this embodiment is that an actual measurement is taken, and thus a more precise value of the voltage level is obtained.

In a second aspect, the present invention relates to wind power plant arranged to operate according to a method of the first aspect.

In a third aspect, the present invention relates to a computer programmable code implemented by means of hardware, software, firmware arranged to perform the method of the first aspect. Alternatively, in a third aspect, the present invention provides at least one computer program product directly loadable into the internal memory of at least one digital computer, comprising software code portions for performing the steps of the method of the first aspect when said at least one product is/are run on said at least one computer.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The a power plant controller and the method of controlling power plant according to the invention will now be described in more detail with regard to the accompanying figures. The figures show one way of implementing the present invention and is not to be construed as being limiting to other possible embodiments falling within the scope of the attached claim set.

DETAILED DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

The embodiments of the present invention pertain to a power plant controller of a wind power system with a plurality of wind turbine generators. The power plant controller seeks to change its mode of control prior to disconnection of individual wind turbine generators, due to a high voltage or a low voltage event at the terminals of the individual wind turbine generators.

The wind turbine generator which supplies power to an electric grid may be equipped with regulation capacity against voltage level, grid-frequency and active power fluctuations. "Electric grid" or "grid" is a utility grid outside the boundary and point of common coupling of a wind power plant; when reference is made to the grid within a wind power plant an expression with explicit indication to the wind power plant is made, e.g., "wind power plant grid".

Active power is in the present text referred to as "power", or "output power". Where reactive power is addressed, it is explicitly referred to as "reactive power"

A variable speed wind turbine generator, which is used in at least one of the described embodiments and which is capable for being connected to an electrical grid 20 is equipped with the control system described. It comprises a rotor with a hub 3 and at least one blade 4 mounted to the rotor as discussed above. The rotor is connected, for example via a main shaft, to a generator for translating the torque of the rotor into electrical power. In some embodiments, a gearbox is interconnected between the rotor and the generator in order to translate the rotational speed of the rotor into a higher speed for the generator.

Figure 1:
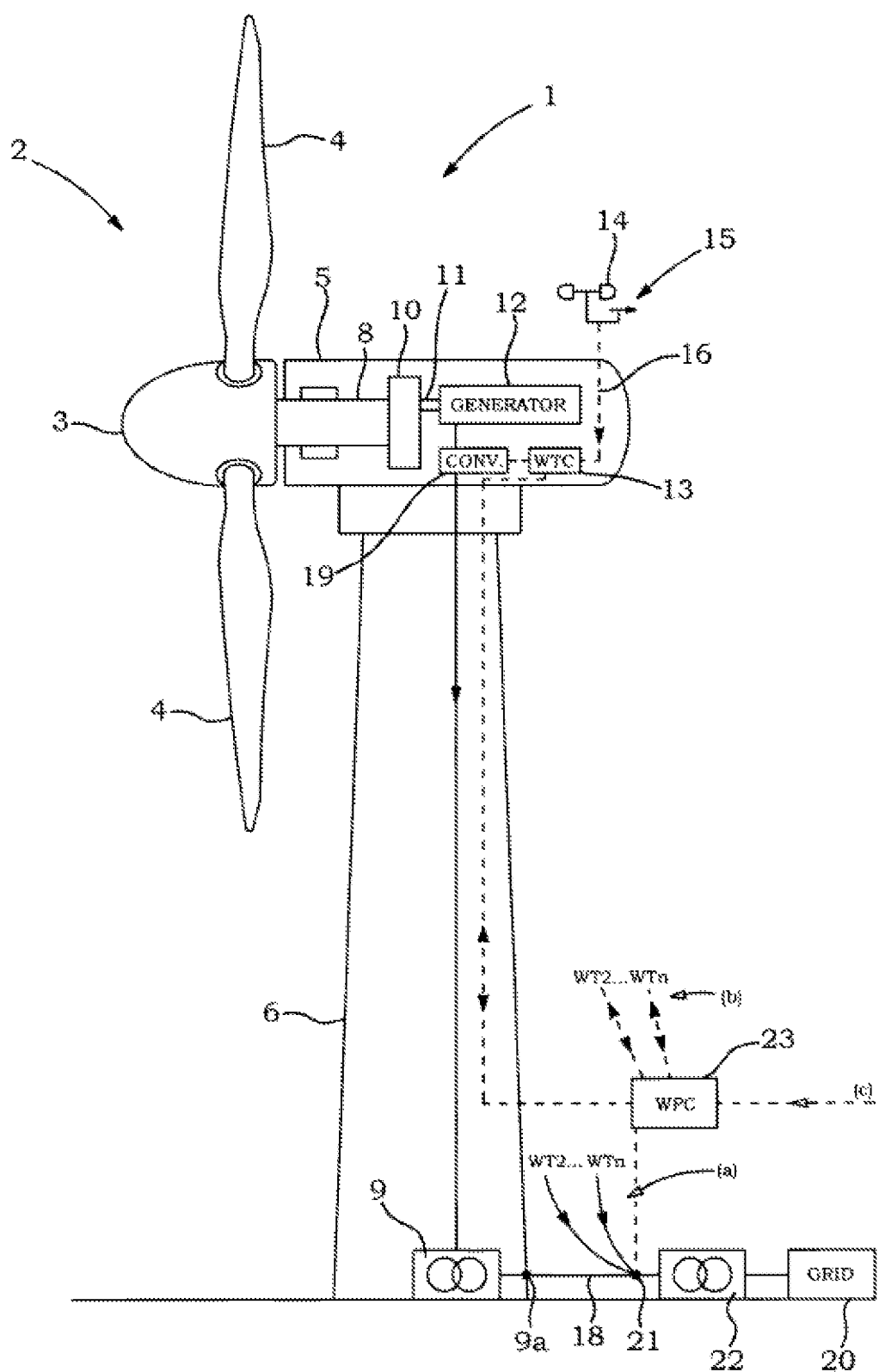
FIG. 1 shows an embodiment of the wind turbine generator according to the present invention.

FIG. 1 shows, an exemplary variable-speed wind turbine generator (WT) 1 is one of a plurality of wind turbine generators of a wind power plant (WPP). It has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high speed shaft 11. This structure is exemplary; other embodiments, for example, use a direct-drive generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant is fed into a wind power plant grid 18 (symbolized by "a" in FIG. 1). The wind power plant grid 18 is connected at a point of common coupling 21 and an optional further step up transformer 22 to a wind power plant external electrical utility grid 20. The grid 20 is equipped with regulation capacity against grid-frequency fluctuations, e.g. in the form of conventional producers which can increase and lower production on a short-time scale to control frequency.

A control system includes a wind-turbine controller 13 and a power plant controller 23. The power plant controller 23 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the power plant controller, e.g. an instruction to provide a certain amount of reactive power in addition to the active power, etc. The power plant controller 13 uses different input signals to perform its control tasks, for example signals representing current wind conditions (e.g. from an anemometer 14 and a wind vane 15 transmitted via line 16), feed-back signals representing pitch angle, rotor position, amplitudes and phases of the voltage and current at the generator 12 and the terminals 9a, etc., and command signals from the power plant controller 23. The power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the power plant controller 23 monitors grid stability and, upon detection of a reduction of grid stability, commands the wind-turbine controllers 13 of the wind turbine generator 1 and the other wind turbine generators of the wind power plant 2 (at "b" in FIG. 1) to change operation by limiting fluctuations of the output power supplied. Upon receipt of such a command the wind-turbine controller 13, upon increase of the wind speed, cuts the high-output peak which would then be produced in normal partial-load operation with maximum efficiency, e.g., by adjusting the blade-pitch angle towards the flag position, to comply with the power plant controller's limit-fluctuation command. Thus, in the exemplary embodiment of FIG. 1 the control task of the control system to limit output fluctuations is shared by the power plant controller 23 and the wind-turbine controller 13. In other embodiments this control task is performed by the wind turbine controller 13 alone; in those embodiments, the "control system" is represented just by the wind turbine controller 13, without a power plant controller 23.

Although the wind turbine generator 1 shown in FIG. 1 is expected to have three blades 4, it should be noted that a wind turbine generator may have different number of blades. It is common to find wind turbine generators having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 4 in the rotor 4.

Some embodiments pertain to a control system arranged to control at least one wind turbine generator 1 which may include some, or all, of the wind turbines of a whole wind park, in the manner describe above. The control system can be distributed, e.g. include controllers at the wind power plant and the wind turbine generator level or utility-grid level.

A wind turbine generator is designed to operate within some specific grid conditions, such as a frequency range and especially a voltage range. The frequency range is typically a frequency band around nominal frequency, which is either 50 Hz or 60 Hz in most cases. The width of the frequency band varies as function of the time exposed to the "off"-nominal frequency, meaning that wind turbine generator shall be able to operate for a long time with little frequency variation, and short time with large frequency variation.

Similar situation is valid for the voltage range, although that a high voltage level can be destructive to various components in the electrical circuit. The wind turbine generator is designed to a peak overvoltage level, which can't be exceeded, below that there can be several asymmetrical voltage bands with different time limit, asymmetrical as an upper or lower voltage band may be different, but can have the same time limit.

The upper limits are typically 1.1 pu for permanent operation, and 1.15 pu can be allowed for 300 ms and the higher the voltage the shorter time, such as for 1.3 pu is 5 ms.

Low voltages are not so dangerous or detrimental to the grid; however the current increases, so this may lead to dangerous situation, such as high currents which causes overheating, which in severe cases may lead to fire. For permanent operation the lower voltage is typically set to 0.9 pu, and the disconnection profile for low voltages is similar to the LVRT but with an extended timer.

In an embodiment the power plant controller change mode when wind turbine generators going outside a safe operational voltage range of 1.1-0.9 pu. The actual voltage values other places in the wind power plant, such as at the point of common coupling could be quite different, due to transformer tap changers.

It is important that the individual turbine 1 does not reach their peak upper or lower voltage limit, as disconnection from the grid may be the consequence, and a reconnection may take several seconds or even minutes.

The present invention is intended to prevent disconnection of wind turbine generators 1 from the grid 20. This is achieved by changing the control strategy/mode on wind power plant level from one strategy to another. Wherein the new strategy has more focus on the present voltage level than on other factors, such as power factor.

Figure 2:
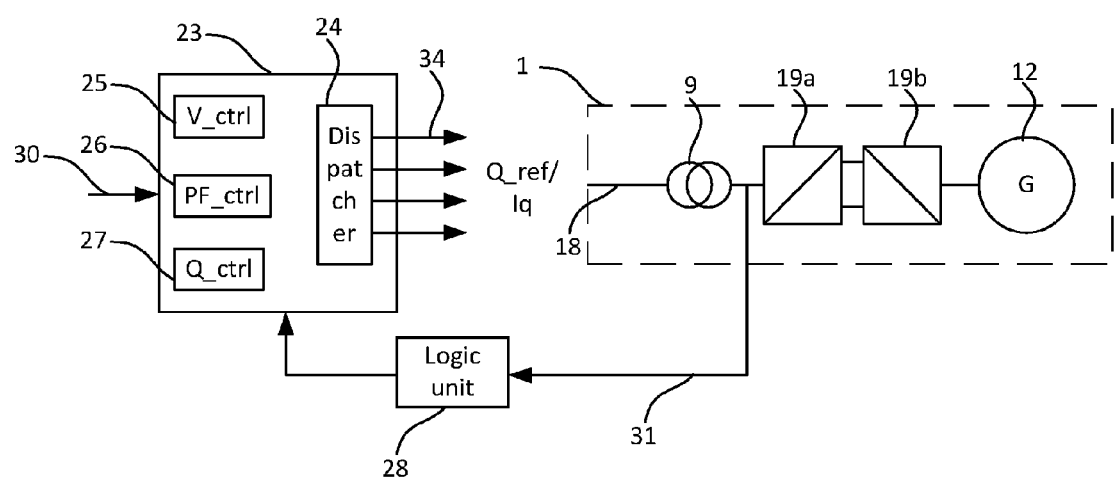
FIG. 2 shows an embodiment of a power plant controller connected to a wind power plant.

FIG. 2 shows a power plant controller 23 according to an embodiment of the invention. FIG. 2 only shows one wind turbine generator 1, which comprises similar elements as described in FIG. 1. In FIG. 2 the Figure only shows a generator 12, connected to, and feeding power to a power rectifier 19b, that converts variable frequency AC power to DC power, an inverter 19a converts the DC power into fixed frequency AC power, the AC power is the transformed to a higher voltage level in a transformer 9, the higher voltage AC power is fed into the wind power plant grid 18. A signal vector 31 containing power production information about the individual wind turbine generator 1, is communicated to a logic unit 28 that receives similar signal vectors 31 from all the other wind turbine generators 1 in the wind power plant. The signal 31 may contain information about a the voltage level of the wind turbine generator, at either side of the transformer 9, often it is beneficial to measure the voltage level at the low voltage side of the transformer, and possibly translate the measurement to a value on the high voltage side of the transformer.

The logic unit 28 collects the signal 31 from the turbine 1 and sends it to the power plant controller 23. The logic unit may be integrated in the power plant controller 23.

The power plant controller 23 receives a set point 30 to follow from e.g. a grid system operator, and, depending on the specific plant, the different modes of control 25, 26, 27 between which the power plant controller can choose. This may be voltage control 25, power factor control 26, and Q (reactive power) control 27. A state machine of the power plant controller 23 changes the mode if so required. When the power plant controller 23 determines that a low voltage level or a high voltage level has been detected and that the voltage is outside the predetermined range, then the state machine of the power plant controller changes the mode of control. The dispatcher 24 then dispatches a new set point 34 to each of the wind turbine generators 1 in the wind power plant. The dispatcher 24 regularly dispatches or communicates set points 34 to the wind turbine generators 1, whenever required.

Alternatively, prior to changing of the control strategy, the dispatched active and reactive power set points 34 from the power plant controller 23 are adjusted to accommodate a lower or higher voltage level at the connection terminal 9a of the individual wind turbine generator 1.

In order to ensure a stable electrical grid 20 various requirements have been set for grid connection of wind turbine generators 1. Topics of the grid codes may vary, but often there are requirement for Voltage control and Frequency control. Different grid codes may require different characteristics for frequency response from wind power. Each grid code may have pros and cons, depending on the characteristics and needs of the particular power system.

In an embodiment with a wind power plant wherein the method according to the present invention is implemented, normally comprises a point of common coupling 21, as mentioned earlier, "behind" the point of common coupling is at least one wind turbine generator with a wind turbine controller connected to the point of common coupling via a length of electrical cabling (often ground cable, but not limited to that could also be overhead lines). The at least one wind turbine generator is controlled from a power plant controller 23. The power plant controller calculates an overall set point 34 for the whole wind power plant. The overall set point may be a vector with several values, such as voltage, active power, reactive power, active current, reactive current etc. The overall set point is sent to a dispatcher algorithm 24 that translates the overall set point for the wind power plant to a plurality of set points, for each individual wind turbine generator 1, and dispatches the plurality of set points 34 to the individual wind turbine generators.

In an embodiment the power plant controller 23 will use a signal coming from each of the wind turbine generators indicating the voltage at terminals 9a of every single wind turbine generator 1. The wind power plant can change its operational control mode strategy for Low or high voltage events at wind turbine generator terminals 9a when knowing the voltage at the terminals 9a of the wind turbine generators. Upon receiving of these signals 31 the plant control will modify is normal dispatching and control strategy for the wind turbine generators sending these signals. E.g. The power plant controller is operating in power factor control mode with a capacitive reference an wind turbine generators experienced high voltage at terminals (V>110%), at this moment then the power plant control 23 can change its control from PF to voltage control, or just simply depending on the number of WTGs with problems can modify the dispatching strategy for these.

The transmission of the actual set point is communicated to the wind turbine generators via digital communication in optical fibres, communication cables or radio communication 32.

In an embodiment a combination between measured voltage at wind turbine generator level and an estimation of the voltage, derived by using the impedance values between point of common coupling 21 and a specific wind turbine generator 1, in this case it is possible to calculate for any scenario the maximum and minimum Q values (reactive power) for the dispatcher to every wind turbine generator to avoid violation of the voltage limits.

The impedance estimation (in principle the impedance data is based on theoretical values) can be calibrated when some conditions are fulfilled, such as steady state of the signals used in the equation, thus, the wind turbine generator voltage can be used in combination with the system impedances.

Once the limits (inductive and capacitive) for reactive power are defined, then if the wind turbine generators are reaching their specific limit then the plant may change control mode if possible, by using the state machine.

So the received measured voltage is used as in a low flow with all the measured values such as active power P and reactive power Q together with the impedance data to calculate maximum allowed Q limits.

This can be simplified and done for an aggregated wind turbine generator, instead of for all wind turbine generators, where the worst case is chosen as representative, such as wind turbine generators with highest impedance.

In an embodiment the estimated voltages of the wind turbine generators are used instead of measured voltages, when the communication is delayed, and therefore not fast enough to prevent the disconnection by the power plant controller action.

In an embodiment the wind power plant also comprises other devices, such as power compensation devices, i.e. STATCOMs or switch capacitor etc. These devices also receive set point commands from the dispatcher 24.

An embodiment comprises a power plant controller 23 that will use the wind turbine generators terminal voltage to decide the control strategy to follow at plant level. The wind turbine generators terminal voltage is monitored in the plant control and when reaching some trigger conditions, such as a voltage range the plant control will change its control or dispatcher. The voltage can have low trigger value and a high trigger value.

The voltage, coming from each wind turbine generator, either as an estimate or a real measurement, is used as input in the power plant controller. The voltage consists of a positive sequence part and negative sequence part.

Detection of the positive-sequence voltage component at fundamental frequency of the utility voltage under unbalanced and distorted conditions, and grid faults is essential to keep the control over the power exchange with the grid, thus avoiding to trip of protection equipment, and thereby allowing a so called ride-through of the transient fault.

In an embodiment the voltage level is determined based on a positive sequence part of a measured voltage signal. Preferably the fundamental frequency positive sequence is used.

Often when operating wind power plants through a power plant controller the voltage level at the point of common coupling is controlled by a system operator by sending a power factor (PF) set point to the power plant controller.

In an embodiment of the present invention the power plant controller 23 reads the actual voltage level value of the wind turbine generator(s) 1 as a parameter in the communication protocol 31, the voltage level value is then compared to a threshold value, if the voltage level value is lower than a lower threshold value then a Low Voltage (LV) situation has occurred, and if the if the voltage level value is higher than a higher threshold value then a High Voltage (HV) situation has occurred.

In another embodiment the voltage level value is compared to the threshold values in the wind turbine generator(s) and a flag is communicated 31 to the power plant controller indicating LV situation or HV situation.

In an embodiment of the invention, prior to change the operational mode in the wind turbine controller, the dispatcher will decrease or increase the reactive power set point, send to a specific wind turbine generator, being close to a LV or HV situation. An increase in reactive power will increase the voltage level at the wind turbine generator terminals, so being close to a HV situation the reactive power production needs to be decreased, this is achieved by sending a reactive power set point with a decreased reactive power value. Similar being close to a LV situation the reactive power set point should be increased in order to raise the voltage level the voltage level at the wind turbine generator terminals.

Often wind power plants, in steady state operational mode, is controlled according to a Power Factor set point, this implies that for a given active power production a corresponding amount of reactive power, inductive or capacitive, needs to be present as well, as the power factor of an AC electrical power system is defined as the ratio of the real power flowing to the load to the apparent power in the circuit.

Other operational mode can be Q control, where the actual amount of reactive power is controlled, thus not in respect of the active power production. Yet another mode can be voltage control where the voltage level is the control parameter, this control is performed by injecting reactive power, inductive or capacitive into the grid and thereby increasing or decreasing the voltage level.

In an embodiment Q control could be also a simple feed-forward, going with the external references directly to the dispatcher.

The wind turbine generators are either operated in current mode or in power mode or in a combination of both, thus they will receive either a current set point or a power set point respectively or both, the current or power set point comprises an active and a reactive component.

Some grid codes requires controlling the wind power plant in PF/Q/voltage (feedforward Q), thus if a lot of wind turbine generators reach over- or under-voltages the power plant controller should change mode, preferably to voltage control.

Additionally, a reference change for the PF/Q/feedforward Q controllers can be done instead, then the power plant controller will not follow grid operator/costumer references 30 during this. The change in the references will be activated with the state machine, and the reference used will be according to the: measured voltage, Q, P and how many wind turbine generators are in over-under voltage (more signals maybe used, such as references sent, tap changer status).

In an embodiment when the wind turbine generator loose communication with power plant controller 23 will change mode, and typically they change to PF=1, in this way they are neutral for the operation of the plant.

Whenever the operational mode of the power plant controller is changed, it is important to determine when to return to "normal" operation again.

In an embodiment a timer is implemented, thus after the voltage level has returned to a normal range again, a timer starts to count and when the timer expires the operational mode changes back to normal mode.

In an embodiment a hysteresis algorithm is implemented together with the normal voltage level. The hysteresis can be implemented both when entering the changed mode in order to protect the wind turbine generators, but more often when returning from the changed mode back to normal mode.

The hysteresis level can be selected according to the system impedance (ratio between reactive and voltage), typically it can be 2%.

Changing operational mode, will in the basic setup cause a transient in the controller output as the output is calculated, based on other parameters. It is possible to achieve bumpless transfer while switching between the different controllers (Power factor, Voltage and Reactive power), on the fly. The bumpless switching mode is functionality to ensure that shifts between reactive power mode, power factor mode, voltage control mode is done seamless without jumps in reactive power and voltages. When mode shifting is done, the loop starts by setting the reference equal to the current production of interest and after that the inner reference is ramped slowly to the selected reference source with a predefined fixed ramp value. When the ramping is done, the loop enters steady lock mode and the full bandwidth of dynamics is then available.

In an embodiment the power plant controller is determining if the voltage level of one or more wind turbine generator(s) is outside a second predetermined range and inside the first predetermined range, the second predetermined range being smaller than the first predetermined range, and if so, the power plant controller is dispatching an adjusted reactive power set point or an adjusted reactive current set point to said one or more wind turbine generator(s), the adjusted reactive power set point or the adjusted reactive current set point, having a value causing the voltage level to change to a value inside the second predetermined range.

Figure 3:
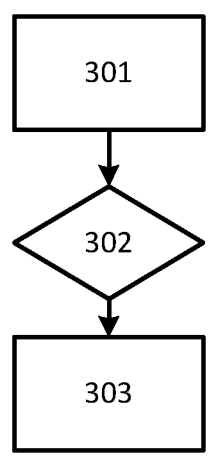
FIG. 3 shows a flow-chart of an embodiment of the method according to the present invention.

FIG. 3 show a flow-chart of a method according to the invention for controlling voltage level in a wind power plant, with one or more wind turbine generator(s) connected to an electrical grid, and a power plant controller having an operational mode, controlling electrical parameters in the electrical grid. Step 301 is determining a first voltage level of one or more wind turbine generator(s), step 302 is determining whether the first voltage level of one or more wind turbine generator(s) is outside a first predetermined range. In case the first voltage level of one or more wind turbine generator(s) is outside a first predetermined range then, in step 303, the operational mode of the power plant controller is changed between first and second operational modes, the first operational mode controlling a first electrical parameter, the second operational mode controlling a second electrical parameter, the first and second parameters being different.

The embodiment of the invention presented here relates mainly to a wind turbine generator, but is it not limited to wind power. Other sources of power production are also considered. Wherever the wording controller is used it is understood that such controller can be selected from controllers known to the person skilled in the art, such as PID, PI, P or with fuzzy logic, but not limited to the list.

The invention can be implemented by means of hardware, software, firmware or any combination of these. The invention or some of the features thereof can also be implemented as software or computer programmable code running on one or more data processors and/or digital signal processors, i.e. computer.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. A method for controlling a wind power plant, comprising a plurality of wind turbine generators connected to an electrical grid, and a power plant controller having an operational mode, wherein the power plant controller is arranged for controlling electrical parameters, wherein the method comprises:
   determining respective first voltage levels of the plurality of wind turbine generators, and
   upon determining that the respective first voltage levels of the plurality of wind turbine generators are outside a first predetermined range:
      changing the operational mode of the power plant controller between first and second operational modes, wherein the power plant controller in the first operational mode is controlling a first electrical parameter, and wherein the power plant controller in the second operational mode is controlling a second electrical parameter, the first and second parameters being different; and
      dispatching a respective set point according to the second operational mode to each of the plurality of wind turbine generators.

2. A method according to claim 1, wherein a dispatcher establishes an upper limit and lower limit for the respective set point based on an estimation of a maximum possible voltage increase or minimum possible voltage decrease.

3. A method according to claim 1, wherein subsequent to the change of the operational mode of the power plant controller, the method further comprises:
   dispatching a respective interim set point as determined according to the first operational mode to each of the plurality of wind turbine generators and,
   ramping the respective interim set point to a set point as determined according to the second operational mode, with a ramp rate value, until the respective interim set point equals the set point according to the second operational mode.

4. A method according to claim 1, wherein the power plant controller in the first operational mode is controlling a power factor and the second operational mode is controlling a voltage level or a reactive power.

5. A method according to claim 1, wherein the power plant controller in the first operational mode is controlling a voltage level and the second operational mode is controlling a power factor or a reactive power.

6. A method according to claim 1, wherein the power plant controller in the first operational mode is controlling a reactive power and the second operational mode is controlling a voltage level or a power factor.

7. A method according to claim 1, wherein the respective first voltage levels are determined based on a positive sequence part of a determined voltage level.

8. A method according to claim 1, wherein determining that the respective first voltage levels are outside the first predetermined range is carried out in respective wind turbine controllers within the plurality of wind turbine generators, and the results are communicated to the power plant controller.

9. A method according to claim 1, wherein operating the wind power plant according to the second operational mode further comprises:
   determining respective second voltage levels of the plurality of wind turbine generators, determining if the respective second voltage levels are inside the first predetermined range, if the respective second voltage levels are inside the first predetermined range then, changing the operational mode of the power plant controller from the second operational mode to the first operational mode.

10. A method according to claim 9, wherein the changing of the operational mode is based on a hysteresis control algorithm and/or a timer.

11. A method according to claim 1, wherein determining that the respective first voltage levels or the respective second voltage levels is carried out by an estimate based on electrical parameters in the wind power plant.

12. A method according to claim 1, wherein determining that the respective first voltage levels or the respective second voltage levels is carried out by measurement of the respective first voltage levels or the respective second voltage levels respectively.

13. A power plant controller, arranged to control electrical parameters in a wind power plant, the wind power plant comprising a plurality of wind turbine generators, the power plant controller having at least a first operational mode and a second operational mode, said power plant controller is arranged to determine whether a respective first voltage levels of the plurality of wind turbine generators are outside a first predetermined range: and, in case the respective first voltage levels of the plurality of wind turbine generators are outside the first predetermined range then:

said power plant controller is arranged to change the operational mode of the power plant controller between the first and the second operational modes, wherein the power plant controller in the first operational mode controls a first electrical parameter, and wherein the power plant controller in the second operational mode controls a second electrical parameter, the first and second parameters being different; and said power plant controller is further arranged to dispatch a respective set point according to the second operational mode to each of the plurality of wind turbine generators.

14. A wind power plant arranged to operate according to a method as claimed in claim 1.

15. At least one computer program product directly loadable into the internal memory of at least one digital computer, comprising software code portions for performing an operation for controlling a wind power plant, comprising a plurality of wind turbine generators connected to an electrical grid, and a power plant controller having an operational mode, wherein the power plant controller is arranged for controlling electrical parameters, wherein the operation comprises:

determining a respective first voltage levels of the plurality of wind turbine generators; and upon determining that the first respective voltage levels of the plurality of wind turbine generators are outside a first predetermined range:

changing the operational mode of the power plant controller between first and second operational modes, wherein the power plant controller in the first operational mode is controlling a first electrical parameter, and wherein the power plant controller in the second operational mode is controlling a second electrical parameter, the first and second parameters being different;

dispatching a respective set point according to the second operational mode to each of the plurality of wind turbine generators.

* * * * *